United States Patent [19]
Brothers

[11] 3,961,765
[45] June 8, 1976

[54] MULTI-POSITION CONTAINER HOLDING ARRANGEMENT

[76] Inventor: Alvin O. Brothers, 2001 E. Franklin St., Evansville, Ind. 47711

[22] Filed: Dec. 26, 1973

[21] Appl. No.: 427,991

[52] U.S. Cl. ............................ 248/126; 248/226 B; 248/235
[51] Int. Cl.² ......................................... F16M 13/00
[58] Field of Search.......... 248/12, 126, 207, 226 B, 248/235

[56] References Cited
UNITED STATES PATENTS

| | | | |
|---|---|---|---|
| 335,503 | 2/1886 | Butler | 248/207 |
| 442,685 | 12/1890 | Moore | 248/207 |
| 454,553 | 6/1891 | Whitten | 248/207 |
| 1,105,039 | 7/1914 | Olbon | 248/126 |
| 1,199,553 | 9/1916 | Hogan | 248/207 |
| 1,266,241 | 5/1918 | Farber | 248/207 |
| 1,494,527 | 5/1924 | Bieder | 248/126 |
| 1,764,071 | 6/1930 | Foulke | 248/207 X |
| 2,985,414 | 5/1961 | Jnce | 248/42 |

FOREIGN PATENTS OR APPLICATIONS

| | | | |
|---|---|---|---|
| 213,760 | 6/1941 | Switzerland | 248/126 |

*Primary Examiner*—William H. Schultz
*Attorney, Agent, or Firm*—Jenkins, Hanley & Coffey

[57] ABSTRACT

Structure for supporting a container in one of two positions, viz. on self-contained feet or on scaffolding, such being so arranged for easy conversion from one purpose to the other and representing a minimum of components readily positioned for use.

7 Claims, 5 Drawing Figures

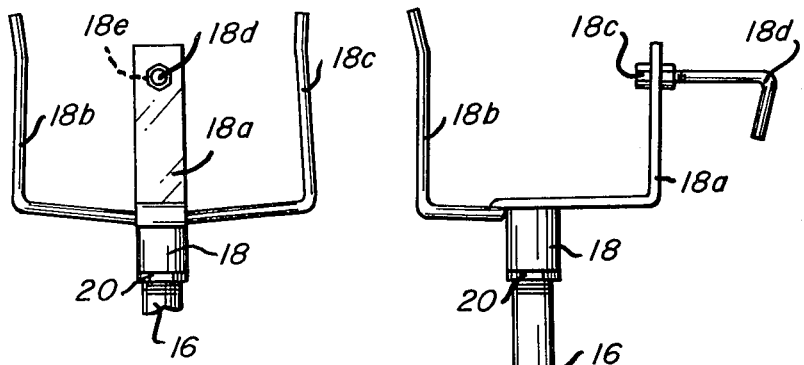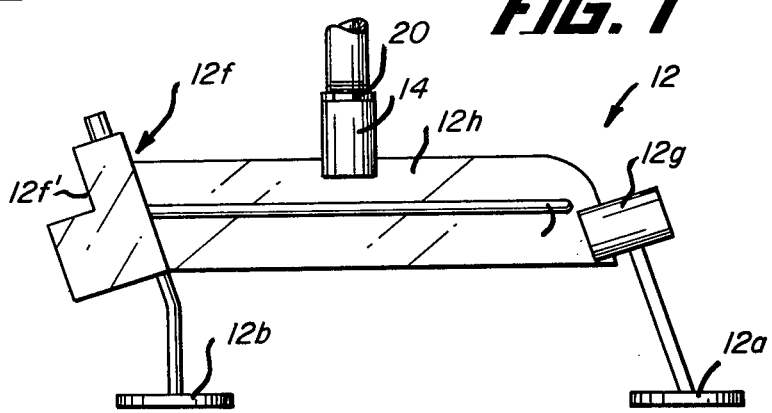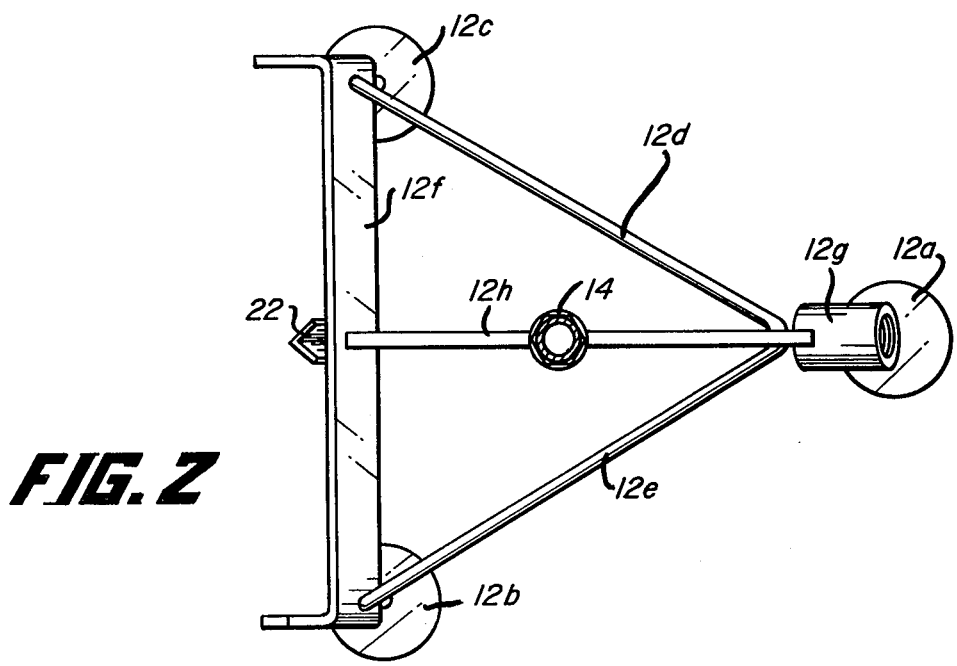

MULTI-POSITION CONTAINER HOLDING ARRANGEMENT

As is known, a workman, such as a painter, encounters various access situations during any given job. For example, and as a matter of illustration, sometimes it is important to have the paint container or can on the ground or other flat surface for ready availability, while, at other times, the painter is on scaffolding for higher elevation work, but again requiring the paint container to be immediately at hand, and, incidentally, slidable along such scaffolding as the work progresses from one region of painting to another.

The preceding brings to light the necessity of having the paint container within easy distance of the user, not only representing a savings in time, but, of course, ultimate economies to a commercial customer. Briefly, the invention is defined by multiple legs, in a tri-pod arrangement, supporting an upstanding member having means carrying a can or container within a defined space, and, additionally, a handle for simplicity in transporting.

By movement of the overall unit, as through tilting action, the invention becomes adaptable for use in connection with known scaffolding, the latter having various configurations, but generally including I-type side edges. Means are provided for loosening or tightening the holder in any desired position along the scaffolding. Additionally, a coupler may be provided for increasing the length of the structure for ease in adaptation to scaffoldings having various widths and, as well, with the removal thereof, affords a ready and convenient size for packing in the instance of transporting from the manufacturing source or from site to site during use.

While the discussion herein is directed to a container for paint, it should be evident that other end uses are equally achievable, the following being illustrative in this connection. In any event, a better understanding of the invention will become more apparent from the following description, taken in conjunction with the accompanying drawings, wherein FIG. 1 is a view in side elevation, partly fragmentary, showing the instant multi-position container holding arrangement in a first position;

FIG. 2 is a top plan view of the device corresponding to that shown in FIG. 1;

FIG. 3 is a detailed view, partly fragmentary, looking from right to left in FIG. 1, showing details thereof;

Figures 4, 5:
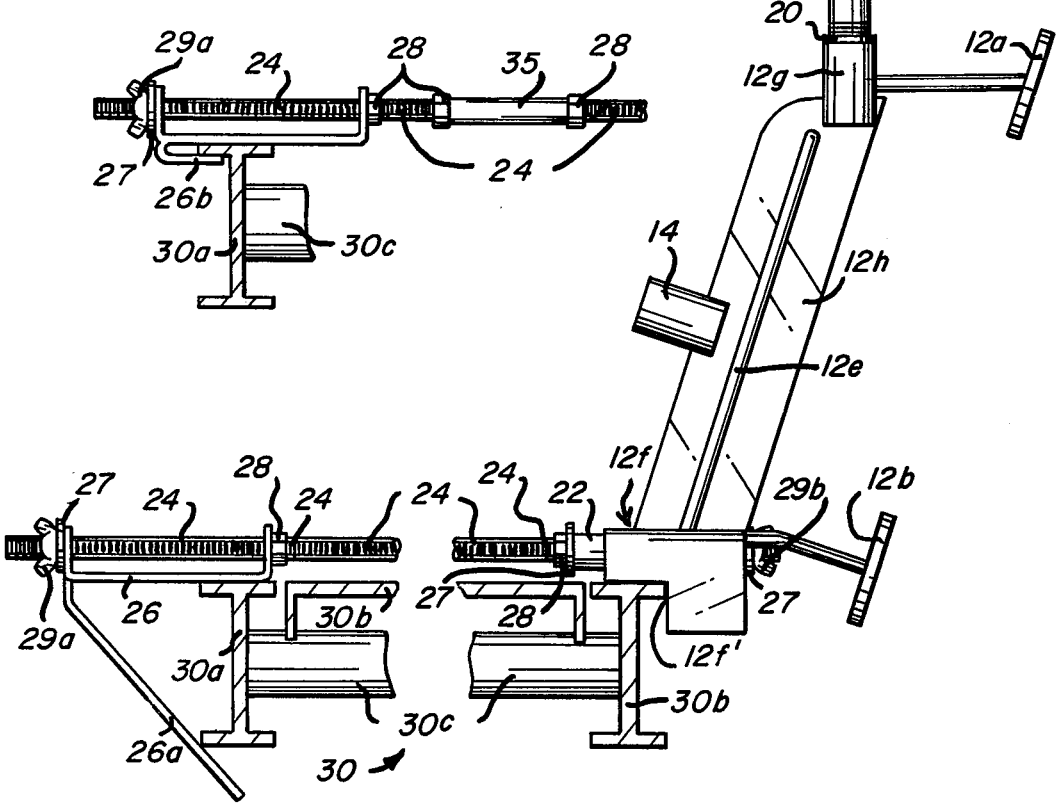
FIG. 4 is a view in side elevation, partly fragmentary, showing the multi-position container holding arrangement in a second position of use; and, FIG. 5 is another view in side elevation, also partly fragmentary, showing the invention in use in connection with a coupler.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the multi-position container holding arrangement of the invention comprises a framework 12 having feet 12a, 12b and 12c interconnected by bracing 12d and 12e, as well as a panel 12f.

An internally threaded sleeve 12g connects legs 12a, while the aforesaid panel 12f extends above and between legs 12b and 12c, the ends of such panel 12f having cut-out portions 12f' (see FIGS. 1 and 4). A member 12h extends between the sleeve 12g and the panel 12f and supports another sleeve 14, also internally threaded, being welded into position, for example.

The preceding is evident in the lower portion of FIG. 1 and in FIG. 2. Looking at FIGS. 1 and 3, a tubular member or rod 16 extends between the sleeve 14 and another sleeve 18, the latter supporting outwardly and upwardly extending arms or strips 18a, 18b and 18c, typically 120° apart, and serving container carrying or receiving purposes.

Strip 18a has provisions for mounting an outwardly extending member 18d which serves, if desired, as a handle. The rod 16 is maintained in position between the sleeves 14 and 18, after being threaded into position, by lock-washers 20.

As should be evident from FIGS. 1, 2 and 3, the overall unit is so positioned for receiving a paint container or can (not shown) when the feet 12a, 12b and 12c are on any desired surface, such as the ground (a first position). In order to adapt the holder for use on scaffolding, the rod 16 and the structure including and supported by sleeve 18 are removed and threaded into the sleeve 12g, positioning again being secured by lock-washers 20 (see FIG. 4).

The lower framework of the holder of the invention includes a hollow angle 22 extending beneath and from panel 12f, through which a threaded bolt 24 extends, passing through openings in an elongated upfacing U-member 26. The assembly is completed by washers 27, nuts 28 and wing-nuts 29a and 29b.

At this time, it should be noted that U-member 26 may be defined in different forms, such as shown in FIGS. 4 and 5. In FIG. 4, a strip 26a extends downwardly and angles rearwardly, in engaging relationship, when in use, with reference to a side I-member 30a defining an edge of scaffolding 30. As evident, the scaffolding 30 has a top surface 30b and lateral members 30c (see FIG. 4).

In use, an opposite side edge 30b of scaffolding 30 is, as stated, engaged by cut-out portions 12f' at opposite ends of panel 12f. Securing may be accomplished by the tightening or tensioning of the wing-nuts 29a and 29b, cooperating with nuts 28. Upon loosening from a secured position, the overall assembly is readily moved along the scaffolding 30 to any desired position.

FIG. 5 is of interest in showing the strip 26b having a rearwardly return configuration, i.e. encasing the upper surface of the I-beam edge 30a of the scaffolding 30. Strip 26b may also be bent or tapered downwardly (not shown) for ease in removal. Additionally, a coupler 35 is typically utilized, being threaded into position, in a divided bolt 24, to extend the width of the holder and/or for purposes of disassembly, as in the instance of transporting.

Thus the preceding illustrates an integral arrangement for a container which is versatile in use, i.e. one which may be positioned in a first position, such as on a surface through the use of feet, or in a second position, such as on scaffolding, through securing structure.

Moreover, the legs may be removed, as through threaded means (not shown), when in the aforesaid second position, and, additionally, the lower framework is not used when in the aforesaid first position. In any event, the paint container, when in the second position, being rearwardly of the scaffolding, permits advantageous extra walking space on the scaffolding.

Additionally, the bend of the arms 18b and 18c, in line with a jamb nut 18e, is approximately 120° apart (also with reference to arm 18a), serving to snugly confine the container. A washer (not shown) could be added to the jamb nut 18e for further tensioning. Flipping action effects container removal.

The described unit is susceptible to changes within the spirit of the invention, such as proportioning and the like, and, thus, as mentioned, the above should be considered illustrative and not as limiting the scope of the following claims:

I claim:

1. A multi-position container holding arrangement comprising a framework having legs supporting a container-receiving assembly at a first upstanding position, scaffolding, and releasable positioning means extending from said framework and selectively mounting said framework on said scaffolding at a tilted position of said framework to define a second container-receiving assembly position, said framework having means including first and second sleeves for receiving said container-receiving assembly at said first and at said second position, and means including a third sleeve receiving said releasable positioning means at said second position.

2. A multi-position container holding arrangement comprising a container-receiving assembly and a framework for supporting said assembly in an upstanding orientation upon an upwardly facing surface as well as upon a scaffold board having a flat, upwardly facing walking surface bounded by spaced apart side edges, said framework including legs for engaging the first said surface and means for holding said assembly in such upstanding orientation when said legs are so engaging the first said surface, said framework also including releasable positioning means for selectively mounting said framework on the scaffold board at a tilted position of said framework, and means for holding said assembly in such upstanding orientation when said framework is in said tilted position, the last said holding means being positioned to hold said assembly outwardly from one of said edges of said board, said releasable positioning means including a hook portion of said framework for slidingly engaging said one side edge of said board and an adjustably positioned hook portion for slidingly engaging the other side edge of said board.

3. The holding arrangement of claim 2 where said releasable positioning means includes tension means for adjustably securing said adjustably positioned hook portion to said framework.

4. A multi-position container holding arrangement according to claim 2 wherein said hooked portion of said framework comprises a panel having a central portion and an end portion extending at approximately right angles from each end of said central portion, each of said end portions having an angular notch therein for loosely conforming to said one side edge of said scaffold for removal from said scaffold when said framework is in said tilted orientation by lifting said container-receiving assembly upwardly and toward said scaffold.

5. A multi-position container holding arrangement for selectively holding a container in generally vertically upstanding orientation upon a flat surface or outwardly of a side edge of a scaffold having a flat working surface bounded by two side edges, the arrangement comprising a container receiving assembly, a framework having legs and first, second, and third attachment means and means for engaging one of said side edges of said scaffold, said first attachment means for removably supporting said container-receiving assembly upon said framework at a first upstanding position when said framework rests upon said legs, releasable positioning means having a proximal end adapted for attachment to said second attachment means and a distal end adapted for longitudinally slidingly and removably engaging one of said side edges of said scaffold for longitudinally slidingly and removably engaging said scaffold between said means for engaging one of said side edges of said scaffold and said distal end of said releasable positioning means and for upstandingly supporting said container-receiving assembly in a longitudinally sliding position from said third attachment means outwardly of one of said side edges of said scaffold.

6. A multi-position container holding arrangement according to claim 5 wherein said releasable positioning means further comprises tensioning means for adjusting the tension between said proximal and distal ends thereof.

7. A multi-position container holding arrangement according to claim 5 wherein said distal end of said releasable positioning means comprises hook means for hooking over one of said side edges of said scaffold.

* * * * *